US008015296B2

(12) United States Patent
Bouazizi et al.

(10) Patent No.: US 8,015,296 B2
(45) Date of Patent: Sep. 6, 2011

(54) SYSTEM AND METHOD FOR IMPLEMENTING MBMS HANDOVER DURING DOWNLOADED DELIVERY

(75) Inventors: Imed Bouazizi, Tampere (FI); Ramakrishna Vedantham, Sunnyvale, CA (US)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 11/971,153

(22) Filed: Jan. 8, 2008

(65) Prior Publication Data
US 2008/0307041 A1 Dec. 11, 2008

Related U.S. Application Data

(60) Provisional application No. 60/884,388, filed on Jan. 10, 2007.

(51) Int. Cl.
*G06F 15/16* (2006.01)
*H04B 7/216* (2006.01)
*H04B 3/36* (2006.01)
*H04H 20/71* (2008.01)
*H04L 12/56* (2006.01)
*H04J 3/16* (2006.01)

(52) U.S. Cl. ........ 709/227; 370/342; 370/312; 370/390; 370/469; 455/14; 709/203; 709/228

(58) Field of Classification Search .................. 709/228, 709/230, 233; 370/312, 390, 469; 455/14.1
See application file for complete search history.

(56) References Cited

U.S. PATENT DOCUMENTS

| 7,376,150 B2 * | 5/2008 | Vedantham et al. .......... 370/469 |
| 2005/0245240 A1 * | 11/2005 | Balasuriya et al. ........ 455/414.1 |
| 2006/0023652 A1 * | 2/2006 | Vedantham et al. .......... 370/312 |
| 2006/0030312 A1 | 2/2006 | Han et al. |
| 2006/0059267 A1 * | 3/2006 | Cugi et al. ................... 709/230 |

(Continued)

FOREIGN PATENT DOCUMENTS

WO  WO 2006/136203  12/2006

OTHER PUBLICATIONS

MBMS Roaming Support. Document for discussion and proposal. Tdoc S4-060662, Nov. 6-10, 2006. 3GPP TSG-SA4#41.

(Continued)

*Primary Examiner* — Joseph E Avellino
*Assistant Examiner* — Aftab Nasir Khan
(74) *Attorney, Agent, or Firm* — AlbertDhand, LLP

(57) ABSTRACT

An improved system and method for implementing Multimedia Broadcast/Multicast Service (MBMS) handover during download delivery. Various embodiments of the present invention involve the use of the HTTP/1.1 "chunked" mode to deliver updates of the file delivery table (FDT) of a session in a push-like mode. In order to allow for push delivery of the contents of a FLUTE session, each FDT instance is encoded as one part of a multipart MIME message and is sent as a separate chunk. The receiver can interpret each of the separate chunks to extract the FDT instance from the chunks. The content type of each part of the message is set to "text/xml" or another MIMI type in order to indicate that the content is an FDT instance. After parsing the FDT instance and updating the FDT, the receiver is able to identify which files of the session are of interest and can perform a HTTP GET request to retrieve a specific file.

29 Claims, 5 Drawing Sheets

U.S. PATENT DOCUMENTS

| | | | |
|---|---|---|---|
| 2006/0069802 A1* | 3/2006 | Vedantham et al. | 709/233 |
| 2007/0168523 A1* | 7/2007 | Jiang et al. | 709/228 |
| 2007/0186005 A1* | 8/2007 | Setlur et al. | 709/231 |
| 2009/0201929 A1* | 8/2009 | Patel | 370/390 |
| 2010/0050070 A1* | 2/2010 | Suh et al. | 715/234 |

OTHER PUBLICATIONS

Using MBMS user services on unicast bearer services. Document for discussion and proposal. Tdoc S4-060236, May 15-19, 2006, 3GPP TSG-SA4#39.

International Search Report for PCT Application No. PCT/IB2008/050051.

English translation of Office Action for corresponding Russian Application No. 2009130149 dated Dec. 6, 2010.

Korean Office Action for Korean Patent Application No. 2009-7016503, dated May 12, 2011.

English translation of Korean Office Action for Korean Patent Application No. 2009-7016503, dated May 12, 2011.

* cited by examiner

SYSTEM AND METHOD FOR IMPLEMENTING MBMS HANDOVER DURING DOWNLOADED DELIVERY

CROSS-REFERENCE TO RELATED APPLICATIONS

The present application claims priority to U.S. Provisional Patent Application No. 60/884,388, filed Jan. 10, 2007.

FIELD OF THE INVENTION

The present invention relates generally to the use of the use of the Multimedia Broadcast Multicast Service (MBMS). More particularly, the present invention relates to handover of a MBMS file download session when a client device moves from a MBMS-covered area to a MBMS-outage area.

BACKGROUND OF THE INVENTION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

In recent years, mobile broadcast solutions have been standardized by different organizations, such as the 3rd Generation Partnership Project (3GPP) MBMS service. MBMS is a broadcasting service that can be offered via existing GSM and UMTS cellular networks. 3GPP MBMS enables the resource-efficient delivery of popular multimedia content to the mobile users. A MBMS client can receive content via download delivery, streaming delivery and a combination of streaming delivery and download delivery.

MBMS is a feature described in 3GPP Release 6. However, MBMS may be deployed by operators in only a few areas where it is cost efficient to have broadcast/multicast distribution of popular content. When MBMS subscribers move to areas where there is no MBMS coverage, the operator may distribute the MBMS content in unicast mode. In such a use case, application/transport layer signaling is required in order to ensure the seamless handover between broadcast/multicast mode reception and unicast mode reception of MBMS content.

One of the objectives of a 3GPP SA4 Release 7 work item on MBMS user service extensions is to specify the application/transport layer signaling needed for MBMS content distribution in unicast mode (over streaming and interactive bearers). Another objective is to specify optimization techniques for MBMS content delivery.

Table 1 below shows the current working assumptions in 3GPP SA4 for the mapping between protocols to be used in broadcast/multicast and unicast modes.

TABLE 1

|  | Download only Use Case | Streaming only Use Case | Streaming + Download Use Case |
|---|---|---|---|
| MBMS Content Distribution in Broadcast/ Multicast Mode | FLUTE/UDP | MBMS Streaming Framework RTP/UDP for media transport RTP/UDP for FEC | MBMS Streaming Framework RTP/UDP for media transport RTP/UDP for FEC |

TABLE 1-continued

|  | Download only Use Case | Streaming only Use Case | Streaming + Download Use Case |
|---|---|---|---|
| MBMS Content Distribution in Unicast Mode | OMA-PUSH OTA-WSP OTA-HTTP | FEC transport PSSe RTSP for session control RTP/UDP for media transport | transport + FLUTE/UDP for file download PSSe RTSP for session control RTP for media transport FLUTE/UDP for file download in the same RTSP session |

The File Delivery over Unidirectional Transport (FLUTE) protocol is discussed in the Internet Engineering Task Force (IETF) Request for Comments (RFC) 3926, available at www.ietf.org/rfc/rfc3926.txt (incorporated herein by reference). The User Datagram Protocol (UDP) is discussed in IETF RFC 768, available at www.ietf.org/rfc/rfc0768.txt (incorporated herein by reference). RTP, a transport protocol for real-time applications, is discussed in IETF RFC 3550, available at www.ietf.org/rfc/rfc3550.txt (incorporated herein by reference). The Wireless Session Protocol (WSP) is discussed in the Open Mobile Alliance WAP-230-WSP, available at www1.wapforum.org/tech/documents/WAP-230-WSP-20010705-a.pdf (incorporated herein by reference). The Real Time Streaming Protocol (RTSP) is discussed in IETF RFC 2326, available at www.ietf.org/rfc/rfc2326.txt (incorporated herein by reference).

3GPP Packet-switched Streaming Service (PSS) is the 3GPP's solution for enabling packet-switched streaming in mobile devices. PSS defines protocols and media codecs for enabling the streaming service for mobile devices. PSS is based on RTSP for session setup and control. 3GPP Packet-switched Streaming Service enhancements (PSSe) are currently being defined in 3GPP. The goal of these enhancements is to define extensions to 3GPP PSS Release No. 6 to optimize the streaming service. A general description of PSS can be found in 3GPP TS 26.233 V6.0.0 (2004-09): Transparent end-to-end packet switched streaming service (PSS); General description (Release 6), available at www.3gpp.org/ftp/Specs/archive/26_series/26.233/ (incorporated herein by reference).

For the "download only" use case, the MBMS handover mechanism is currently not fully specified.

An Open Mobile Alliance (OMA)-PUSH session is one option for implementing such a handover but suffers from a number of drawbacks. The OMA-PUSH system is generally as follows according to the proposal in 3GPP TSG-SA4 #41 Tdoc S4-060662. In this system, if a MBMS user equipment (UE) is out of its home network, and if an attribute providing an access address, for example as an unicastAccessURI, is available in the deliver method description, then the MBMS UE registers its MBMS Download Services with the BM-SC. The unicast service delivery registration request includes an identification of the MBMS user service, for example as a serviceId of the MBMS user service and an identification of the user device, for example as the Mobile Station Integrated Services Digital Network (MSISDN) of the MBMS UE.

The MBMS UE makes a unicast service delivery registration request using the HTTP request method GET. HTTP is discussed in detail in the Internet Engineering Task Force (IETF) Request for Comments (RFC) 2616 (June 1999):

"Hypertext Transfer Protocol—HTTP/1.1"] (available at www.ietf.org/rfc/rfc2616.txt and incorporated herein by reference). The serviceId and the MSISDN of the MBMS UE are encoded into the URI query part, which is discussed in detail in IETF STD 0066/RFC 3986 (January 2005): "Uniform Resource Identifier (URI)" (available at www.ietf.org/rfc/rfc3986.txt and incorporated herein by reference incorporated herein by reference) as defined below and included in the HTTP GET request. GET/unicastReg?serviceId=urn:3gpp:0010120123hotdog&MSISDN=436642012345 HTTP/1.1

Host: bmsc.example.com

A MBMS Download Delivery Session may contain one or more files. The files are described in the FLUTE File Delivery Table (FDT). If a MBMS Download Delivery Method contains more than one file, then Multipart MIME, as defined in IETF RFC 2557 (March 1999): "MIME Encapsulation of Aggregate Documents, such as HTML (MHTML)", J. Palme, A. Hopmann, N. Shelness. (available at www.ietf.org/rfc/rfc3986.txt, incorporated herein by reference) is used to encapsulate the files into an aggregate service announcement document.

MBMS download over HTTP push bearers are formatted according to the OMA Push Over-the-Air (OTA) specification, as discussed in OMA Push OTA Protocol (25 Apr. 2001): WAP-235-PushOTA-20010425-a, available at www.openmobilealliance.org/tech/affiliates/wap/wap-235-pushota-20010425-a.pdf (incorporated herein by reference). OTA-HTTP is used over the HTTP push bearer. Application port addressing is used as specified in the OMA Push OTA Protocol. The application ID to be used is as allocated by the OMA Naming Authority (OMNA), as discussed in OMA OMNA Registered PUSH Application ID list www.openmobilealliance.org/tech/omna/omna-push-app-id.htm (incorporated herein by reference). The Content-Encoding header is included if the GZip compression utility is used.

The OMA-PUSH approach suffers from a number of drawbacks. For example, in this arrangement, the broadcast-multicast service center (BM-SC) does not have any information on the state of the MBMS client, i.e., the BM-SC has no idea of which objects, source blocks or symbols are yet to be delivered to the MBMS client via OTA-HTTP. The behavior of the BM-SC, after receiving the above-referenced unicast registration request, is not clear. However, the BM-SC can behave in any one of two ways. If a FLUTE session involves multiple objects of various sizes, then the BM-SC has to transmit all objects of the FLUTE session via the OTA-HTTP session, including the objects that the client had already received in the FLUTE session. This constitutes a substantial waste of resources. Alternatively, after receiving the above mentioned registration request, the BM-SC may send only the remaining objects via OTA-HTTP, which case the client has some 'holes' in the received data. In this scenario, the client has no data from the point when it stopped receiving FLUTE transmission and the point when the BM-SC starts sending the data via OTA-HTTP.

Additionally, at the end of an OTA-HTTP session, the client still has to initiate another HTTP session for the point to point (PtP) repair of the incomplete objects/source blocks. Although the signaling overhead can be reduced if the two HTTP sessions can be combined into one, one HTTP session is initiated by the BM-SC, while the other HTTP session is initiated by the client in these situations.

In the event that the file delivery table (FDT) is dynamic, then the BM-SC server may perform an OMA-PUSH operation to the client whenever there is an updated FDT. In this case, the client does not need do any polling for the FDT updates. However, the above-referenced drawbacks still exist.

Another option for implementing a MBMS handover during download delivery involves using FLUTE/UDP over a unicast system. However this method required unnecessary overhead for the inclusion of FLUTE headers and forward error correction (FEC) repair symbols. In particular, both FLUTE headers and FEC repair symbols are unnecessary for point-to-point delivery. Additionally, for FLUTE/UDP transport, a new RTSP session must also be established.

In addition to the above, the PtP repair request/response mechanism specified in MBMS TS 26.346 v.7.2.0 can also be extended for the MBMS handover use case under a few special circumstances. When a MBMS client moves from an MBMS-covered area into MBMS-outage area, it can trigger the PtP file repair mechanism. The client then attempts to perform FEC decoding of all source blocks of all objects received to that point, determine the number/identity of the missing symbols, and send an HTTP GET request to the repair server by including all required details (e.g., file URI, Source Block Number (SBN), number of missing symbols, Encoding Symbol IDs (ESI) of missing symbols etc). If the client had already received the FDT, and if the FDT remains static for the rest of the FLUTE session, then it knows which file URIs/objects to expect in the remainder of the FLUTE session. The client can then request the repair server for the remaining source blocks in the current object and the remaining objects in the current session. Thus, the MBMS client can reuse the PtP repair request mechanism for the MBMS handover use case also. Unfortunately, the FDTs are very likely to be dynamic, i.e., there may be new instances of FDTs transferred in the same FLUTE session. Therefore, the client cannot assume that the FDTs are static, since FLUTE explicitly allows FDTs to be dynamic, and it allows new instances of FDTs to be delivered in-band of the FLUTE session. Therefore, the PtP repair request mechanism cannot always be overloaded to cover the MBMS handover use case.

It would therefore be desirable to provide a solution that can be used for both static and dynamic FDTs but does not use excessive overhead.

SUMMARY OF THE INVENTION

Various embodiments of the present invention involve the use of the HTTP/1.1 "chunked" mode to deliver updates of the FDT of a session in a push-like mode. Each part of a multipart Multipurpose Internet Mail Extensions (MIME) message is separated by a boundary that is declared in the Content-Type header. Any string that is not expected to appear in the message payload may be used as separator. Each part of the multipart mime message has also to specify the content type of that part. In order to allow for push delivery of the contents of a FLUTE session, each FDT instance is encoded as one part of a multipart MIME message and is sent as a separate chunk. The receiver can interpret each of the separate chunks to extract the FDT instance from the chunks. The content type of each part of the message is set to "text/xml" or another MIMI type in order to indicate that the content is an FDT instance. After parsing the FDT instance and updating the FDT, the receiver is able to identify which files of the session are of interest and can perform a HTTP GET request to retrieve a specific file. The server may indicate the end of the session using the Connection header field of HTTP with a value set to "closed".

With the various embodiments of the present invention, there is no need for a full implementation of OTA-HTTP or OTA-WSP in order to realize the push delivery, as support for HTTP/1.1 is already required by the file repair functionality.

These and other advantages and features of the invention, together with the organization and manner of operation thereof, will become apparent from the following detailed description when taken in conjunction with the accompanying drawings, wherein like elements have like numerals throughout the several drawings described below.

DETAILED DESCRIPTION OF THE PREFERRED EMBODIMENTS

Various embodiments of the present invention involve the use of the HTTP/1.1 "chunked" mode to deliver updates of the FDT of a session in a push-like mode. The chunked mode is defined in HTTP/1.1 in order to support dynamic content generation and delivery from the server. In several cases, a web server may not be aware of the exact length of the content. The chunked mode is a form of transfer encoding that allows the content to be split into chunks of known length, and each chunk can then be sent to the receiver in a message part. The HTTP 1.1 chunked mode is usually used with persistent connections which allows a push type delivery. The content of the message is transmitted using the multipart/mixed content type, with each part of the message being delivered as a separate chunk.

The receiver can interpret each of the separate chunks in order to extract the FDT instance from the chunks. The content type of each part of the message is set to "text/xml" or another MIME type to indicate that the content is an FDT instance. After parsing the FDT instance and updating the FDT, the receiver is able to identify which files of the session are of interest and can perform a HTTP GET request to retrieve a specific file. The server may indicate the end of the session using the Connection header field of HTTP with a value set to "closed".

Figure 2:
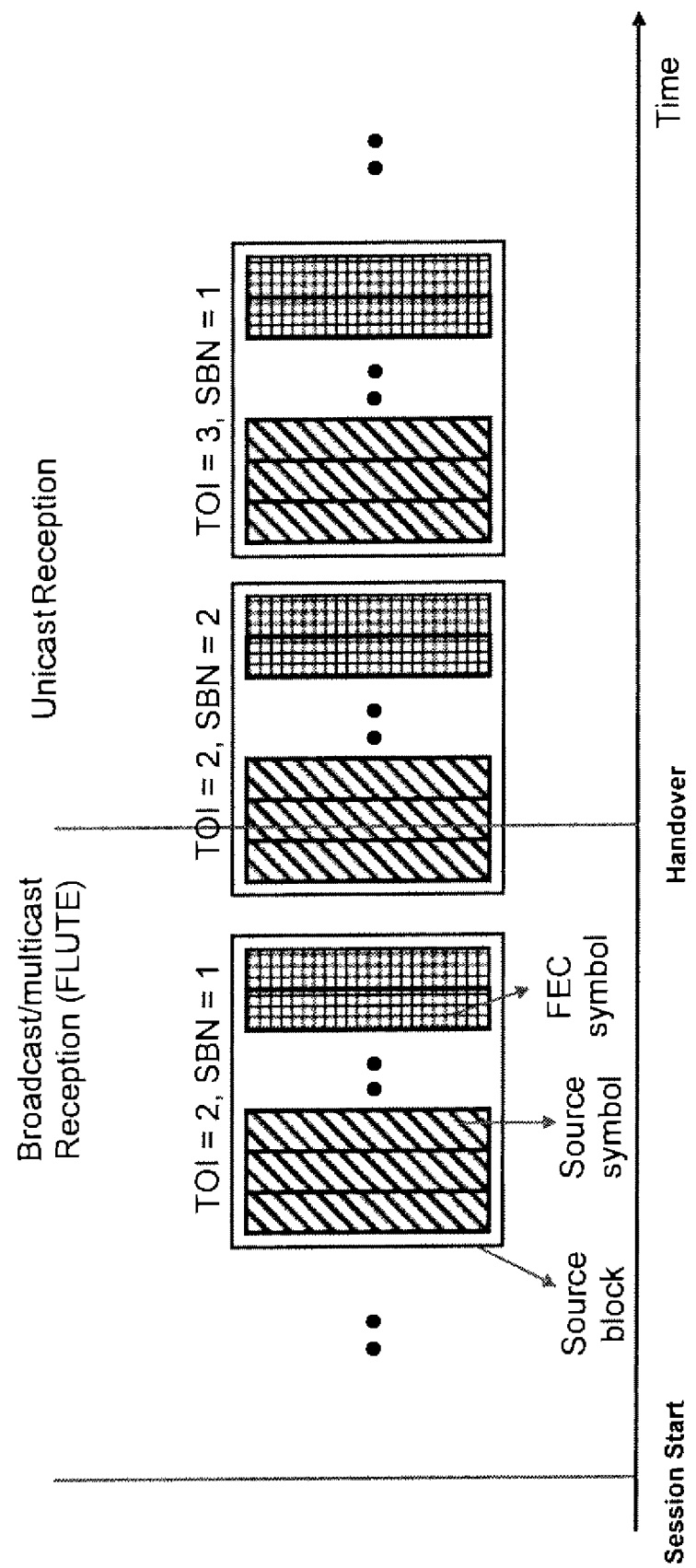
FIG. 2 is a representation showing a MBMS handover during a file download session according to one embodiment of the present invention.
Figure 3:
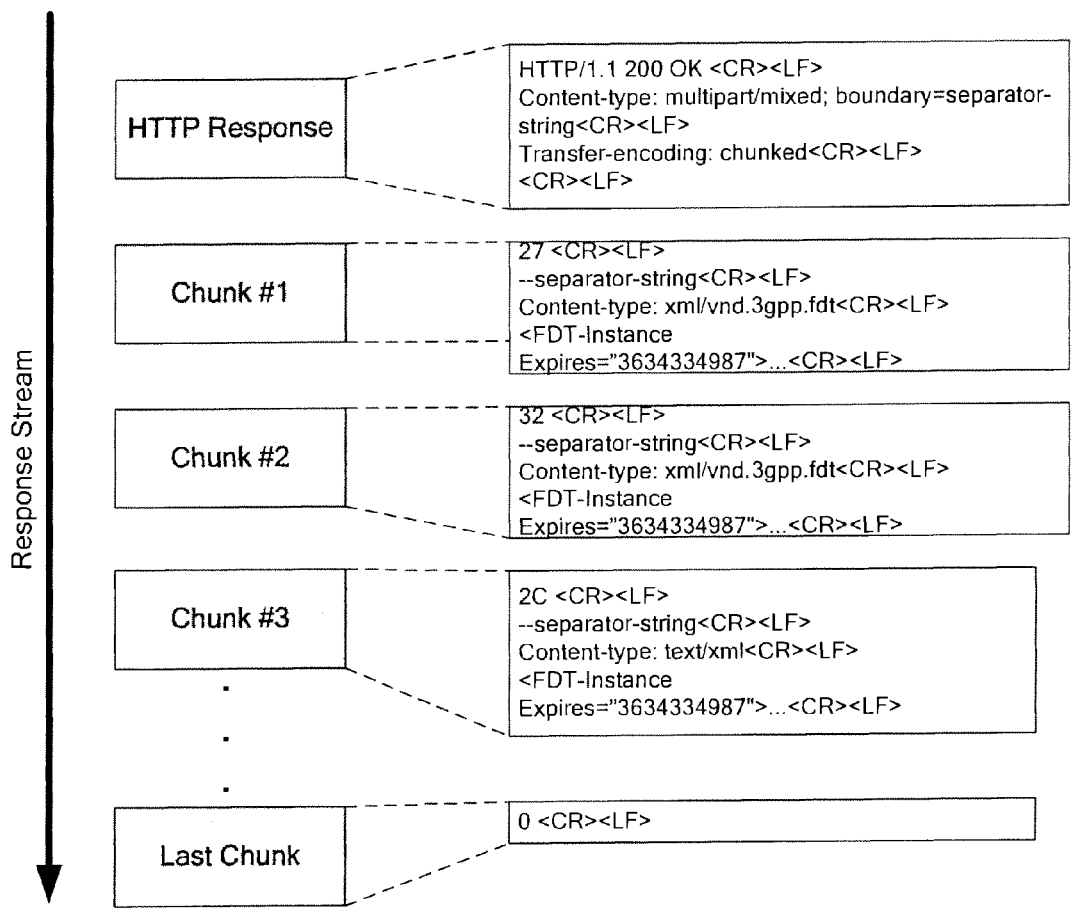
FIG. 3 is a representation showing the transmittal of a plurality of FDT instances from a server to a client terminal via a plurality of chunks in accordance with an embodiment of the present invention.

FIG. 2 shows the MBMS handover process according to one embodiment of the invention in greater detail, with chunks are broadcast/multicast according to the FLUTE protocol before and at the time of the handover. As shown in FIG. 2, once chunks are sent for unicast reception, a new transport object identifier (TOI) is used for the chunks, and the source block number (SBN) for the chunks is reset.

Figure 1:
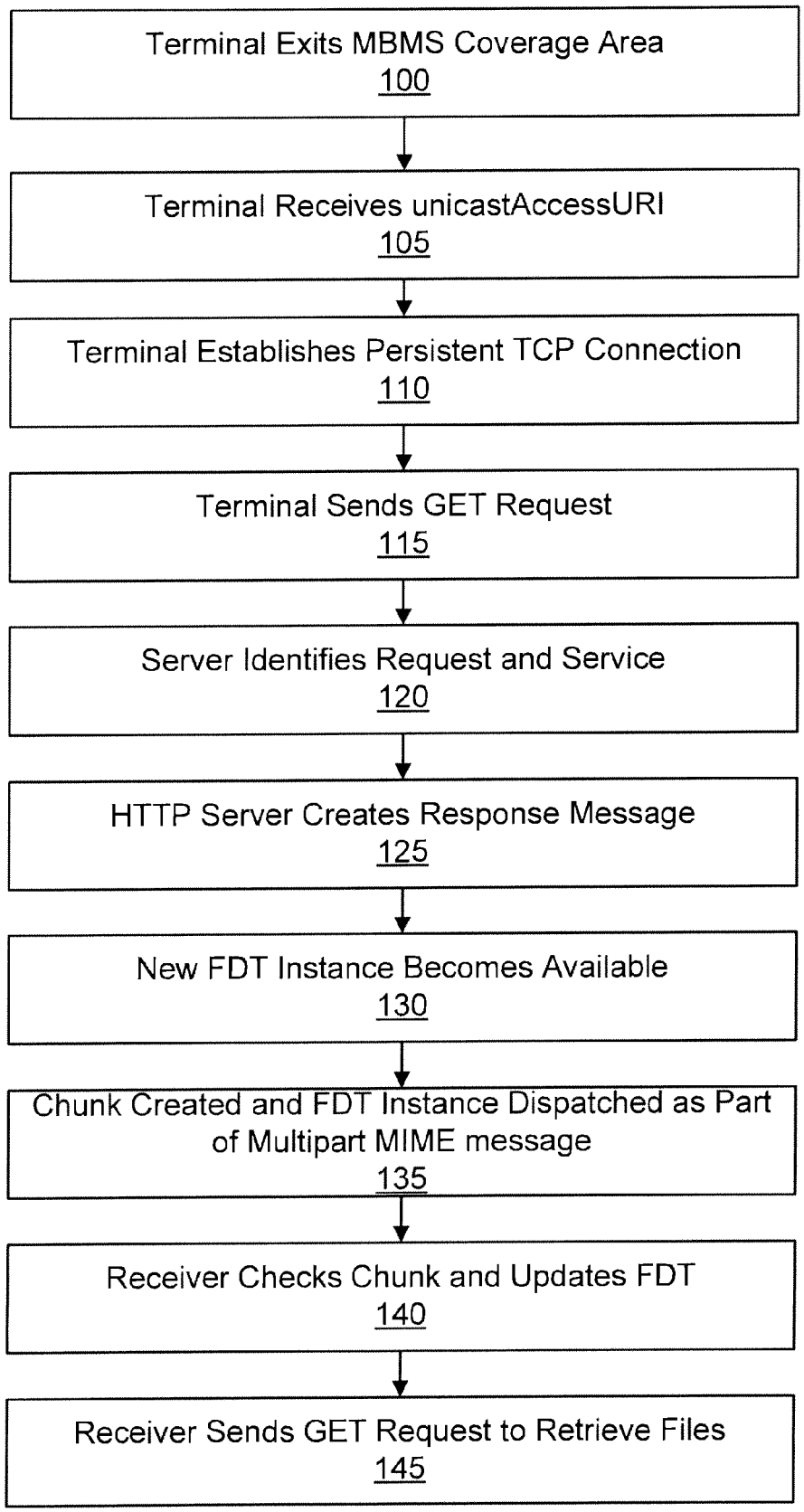
FIG. 1 is a flow chart showing a process by which an embodiment of the present invention is implemented.

FIG. 1 is a flow chart showing a process by which an embodiment of the present invention may be implemented. At 100 in FIG. 1, a terminal, which had been within a MBMS coverage area, leaves the MBMS coverage area. At 105, the terminal retrieves a unicastAccessURI from a service announcement. At 110, the terminal establishes a persistent TCP connection with a HTTP or web server. At 115, the terminal sends a GET request towards the HTTP server. The request URL is identical to the unicastAccessURI, which uniquely identifies the FLUTE session at the HTTP server. The following is a sample of how the request may appear:
GET/flute_service?serviceId=2987324 HTTP/1.1
Host: www.example.com At 120, the HTTP server identifies the received request from the terminal as a request to initiate the unicast delivery of a FLUTE session and identifies the service based on the "serviceId" parameter, which is identical to the serviceId indicated by the service announcement. At 125, the HTTP server creates a response message. The response message indicates whether it is willing to serve the terminal. The following is a sample response including an indication that the HTTP server is willing to serve the terminal:
HTTP/1.1 200 OK
Content-type: multipart/mixed
Transfer-encoding: chunked At 130, a new FDT instance becomes available. When the new FDT instance becomes available, at 135 the HTTP server creates a new chunk and dispatches the new FDT instance as a new part of the multipart MIMI message. This is repeated each time that a new FDT instance becomes available. Figure e is a representation showing the transmittal of FDT instances from the HTTP server to the terminal via a plurality of chunks, after the HTTP response message of 125 has been sent. At 140, the receiver receives and checks the chunk(s) and updates its FDT accordingly. At a subsequent time, represented at 140, the receiver can send a GET request in order to retrieve files of interest.

Figure 4:
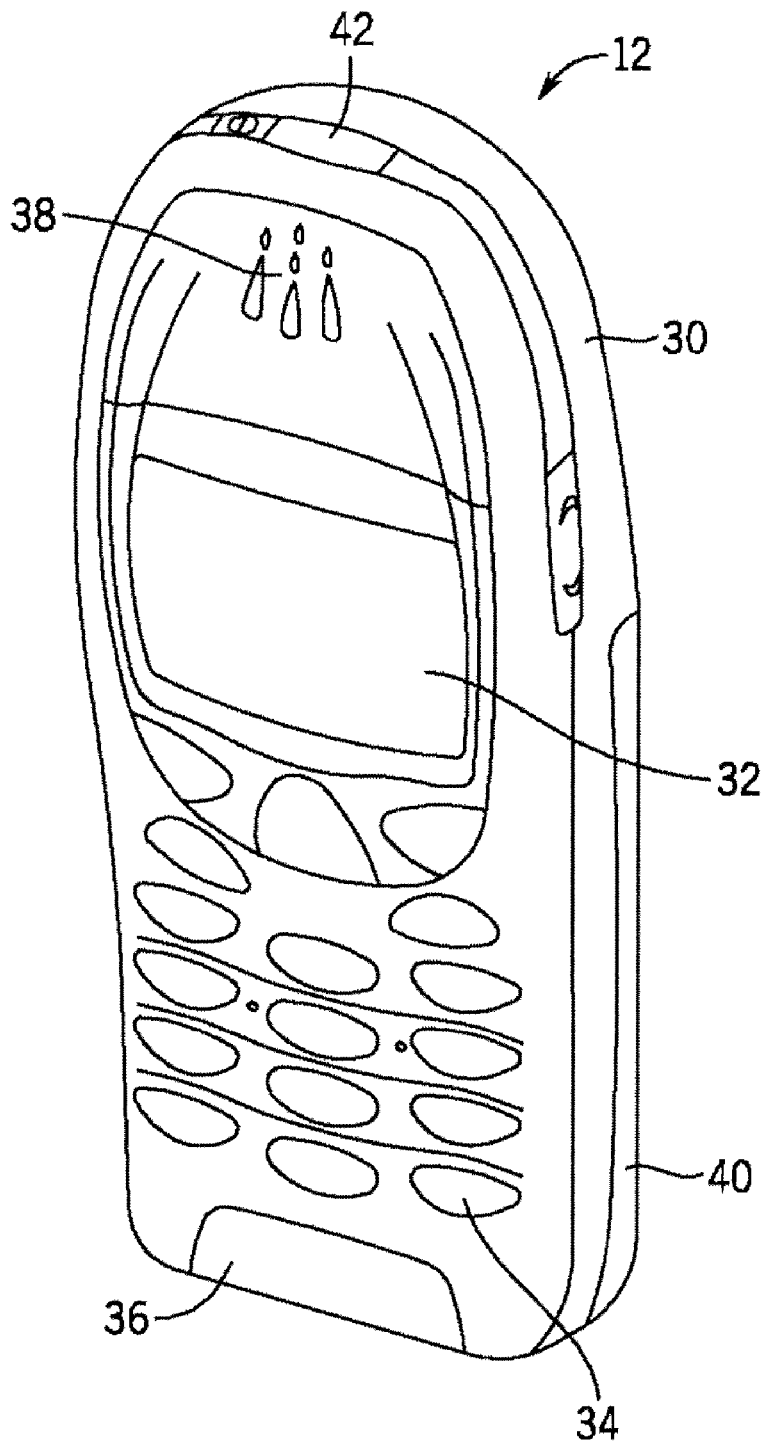
FIG. 4 is a perspective view of an electronic device that can be used in the implementation of the present invention.
Figure 5:
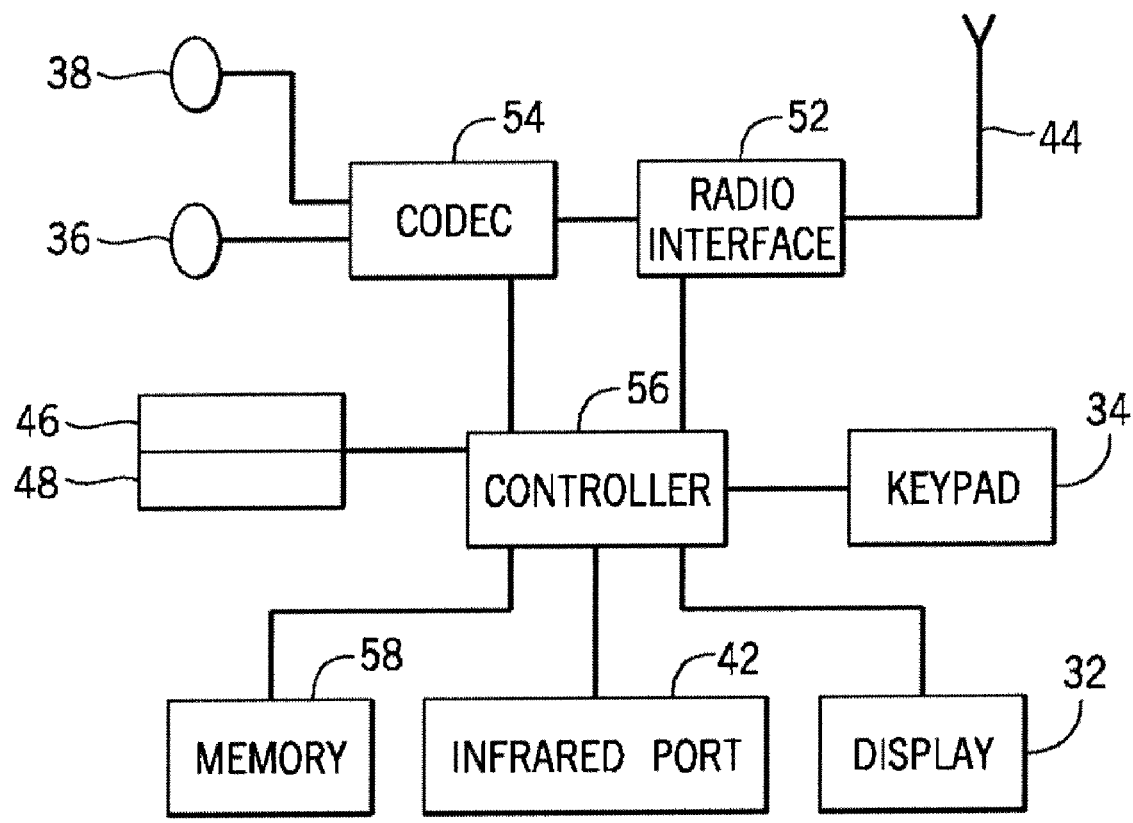
FIG. 5 is a schematic representation of the circuitry of the electronic device of FIG. 4.

FIGS. 4 and 5 show one representative electronic device 12 within which the present invention may be implemented. It should be understood, however, that the present invention is not intended to be limited to one particular type of electronic device 12. The electronic device 12 of FIGS. 4 and 5 includes a housing 30, a display 32 in the form of a liquid crystal display, a keypad 34, a microphone 36, an ear-piece 38, a battery 40, an infrared port 42, an antenna 44, a smart card 46 in the form of a UICC according to one embodiment of the invention, a card reader 48, radio interface circuitry 52, codec circuitry 54, a controller 56, a memory 58 and a battery 80. Individual circuits and elements are all of a type well known in the art, for example in the Nokia range of mobile telephones.

Mobile Telephones.

The various embodiments described herein are described in the general context of method steps or processes, which may be implemented in one embodiment by a computer program product, embodied in a computer-readable medium, including computer-executable instructions, such as program code, executed by computers in networked environments. A computer-readable medium may include removable and non-removable storage devises including, but not limited to, Read Only Memory (ROM), Random Access Memory (RAM), compact discs (CDs), digital versatile disc (DVD), etc. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

Software and web implementations of various embodiments can be accomplished with standard programming techniques with rule based logic and other logic to accomplish the various database searching steps or processes, correlation steps or processes, comparison steps or processes and decision steps or processes. It should be noted that the words "component" and "module," as used herein and in the following claims, is intended to encompass implementations using one or more lines of software code, and/or hardware implementations, and/or equipment for receiving manual inputs.

The foregoing description of embodiments of the present invention has been presented for purposes of illustration and description. The foregoing description is not intended to be exhaustive or to limit embodiments of the present invention to the precise form disclosed, and modifications and variations are possible in light of the above teachings or may be acquired from practice of the present invention. The embodiments discussed herein were chosen and described in order to explain the principles and the nature of various embodiments and its practical application to enable one skilled in the art to utilize the present invention in various embodiments and with various modifications as are suited to the particular use contemplated. The features of the embodiments described herein may be combined in all possible combinations of methods, apparatus, modules, systems and computer program products.

What is claimed is:

1. A method, comprising,
   determining that a multimedia broadcast/multicast service (MBMS) mobile terminal has exited an MBMS service area into a non-MBMS service area wherein the MBMS service area utilizes broadcast/multicast service delivery mechanism;
   establishing a persistent transmission control protocol (TCP) connection with a hypertext transfer protocol (HTTP) server;
   sending a first GET request to the HTTP server, said first GET request being a unicast service delivery registration request sent on the established persistent TCP connection;
   receiving a response message from the HTTP server indicating that the HTTP server is willing to provide service;
   whenever a new file delivery table (FDT) instance becomes available, receiving from the HTTP server the new FDT instance in a chunk of data; and
   retrieving media content based at least in part on the received new FDT instance.

2. The method of claim 1, further comprising, upon receiving the new FDT instance, updating a FDT to reflect the new FDT instance.

3. The method of claim 1, wherein the retrieving media content comprises sending a second GET request to obtain files of interest from the HTTP server.

4. The method of claim 1, wherein the chunk of data is part of a multipurpose internet mail extensions (MIME) message.

5. A non-transitory computer-readable medium, comprising computer executable instructions, said computer executable instructions, when executed, cause an apparatus to perform the processes of claim 1.

6. The method of claim 1, wherein the persistent TCP connection is established using a unicast access universal resource identifier (URI) received from a prior service announcement.

7. The method of claim 6, wherein the first GET request includes a request uniform resource locator (URL) that is identical to the unicast access URI.

8. An apparatus, comprising:
   a processor; and
   a memory communicatively connected to the processor and including computer code, the memory and the computer code, with the processor, cause the apparatus to perform at least the following:
   determine that a multimedia broadcast/multicast service (MBMS) mobile terminal has exited an MBMS service area into a non-MBMS service area wherein the MBMS service area utilizes broadcast/multicast service delivery mechanism;
   establish a persistent transmission control protocol (TCP) connection with a hypertext transfer protocol (HTTP) server;
   send a first GET request to the HTTP server, said first GET request being a unicast service delivery registration request sent on the established persistent TCP connection;
   process a received response message from the HTTP server indicating that the HTTP server is willing to provide service;
   whenever a new file delivery table (FDT) instance becomes available, receive from the HTTP server the new FDT instance in a chunk of data; and
   retrieve media content based at least in part on the received new FDT instance.

9. The apparatus of claim 8, wherein the apparatus is further caused to, upon receiving the new FDT, update a FDT to reflect the new FDT instance.

10. The apparatus of claim 8, wherein the computer executable instructions which cause the apparatus to retrieve media content comprise computer-executable instruction which cause the apparatus to send a second GET request to obtain files of interest from the HTTP server.

11. The apparatus of claim 8, wherein the chunk of data is part of a multipurpose internet mail extensions (MIME) message.

12. The apparatus of claim 8, wherein the persistent TCP connection is established using a unicast access universal resource identifier (URI) received from a prior service announcement.

13. The apparatus of claim 12, wherein the first GET request includes a request URL that is identical to the unicast access URI.

14. A method, comprising:
   receiving a first GET request from a multimedia broadcast/multicast service (MBMS) terminal that has exited a MBMS service area, said first GET request being a unicast service delivery registration request received on a persistent transmission control protocol (TCP) connection;
   identifying the first GET request as a request by the MBMS terminal to initiate unicast delivery of a file delivery over unidirectional transport (FLUTE) session;
   upon deciding to serve the MBMS terminal, sending a response message to the receiver; and
   whenever a new file delivery table (FDT) instance becomes available, sending to the MBMS terminal the new FDT instance in a chunk of data, wherein the new FDT instance is used for retrieving media content by the MBMS terminal.

15. The method of claim 14, wherein the chunk of data is part of a multipurpose internet mail extensions (MIME) message.

16. The method of claim 14, wherein the first GET request includes a request URL that is identical to a unicast access universal resource identifier (URI) from a prior service announcement.

17. The method of claim 14, wherein the retrieving of media content by the MBMS terminal comprises receiving from the MBMS terminal a second GET request to obtain files of interest; and in response to the second GET request, sending the files of interest to the MBMS terminal.

18. The method of claim 14, further comprising identifying a service requested by the MBMS terminal using a service identification parameter, the service identification parameter being identical to an identification contained in a prior service announcement.

19. A non-transitory computer-readable memory including computer-executable instructions, the computer-executable instruction, when executed, cause an apparatus to perform the processes of claim 14.

20. An apparatus, comprising:
   a processor; and
   a memory communicatively connected to the processor and including computer-executable instructions, the memory and the computer-executable instructions, with the processor, cause the apparatus to perform at least the following:
      process a received first GET request from a multimedia broadcast/multicast service (MBMS) terminal that has exited a MBMS service area, said first GET request being a unicast service delivery registration request received on a persistent transmission control protocol (TCP) connection;
      identify the first GET request as a request by the MBMS terminal initiate unicast delivery of a file delivery over unidirectional transport (FLUTE) session;
      upon deciding to serve the MBMS terminal, send a response message to the receiver; and
      whenever a new file delivery table (FDT) instance becomes available, send to the MBMS terminal the new FDT instance in a chunk of data, wherein the new FDT instance is used for retrieving media content by the MBMS terminal.

21. The apparatus of claim 20, wherein the chunk of data is part of a multipurpose internet mail extensions (MIME) message.

22. The apparatus of claim 20, wherein the first GET request includes a request uniform resource locator (URL) that is identical to a unicast access universal resource identifier (URI) from a prior service announcement.

23. The apparatus of claim 20, wherein the retrieving of media content by the MBMS terminal comprises causing the apparatus to perform:
   process a received second GET request to obtain files of interest; and
   in response to the second GET request, send the files of interest to the MBMS terminal.

24. The apparatus of claim 20, wherein the apparatus is further caused to identify a service requested by the MBMS terminal using a service identification parameter, the service identification parameter being identical to an identification contained in a prior service announcement.

25. A system, comprising:
   a multimedia broadcast/multicast service (MBMS) terminal; and
   a hypertext transfer protocol (HTTP) server,
   wherein the MBMS terminal is configured to:
      determine that the MBMS terminal has exited a MBMS service area;
      establish a persistent transmission control protocol (TCP) connection with the HTTP server, and
      send a first GET request to the HTTP server, said first GET request being a unicast service delivery registration request sent on the established persistent TCP connection,
   and wherein the HTTP server is configured to:
      identify the first GET request as a request by the MBMS terminal initiate unicast delivery of a file delivery over unidirectional transport (FLUTE) session,
      upon deciding to serve the MBMS terminal, send a response message to the receiver; and
      whenever a new file delivery table (FDT) instance becomes available, send to the MBMS terminal the new FDT instance in a chunk of data;
   wherein the MBMS terminal is further configured to retrieve media content based at least in part on the new FDT instance.

26. The system of claim 25, wherein the MBMS terminal is further configured to, upon receiving the new file delivery table, update the MBMS terminal's FDT to reflect the new FDT instance.

27. The system of claim 25, wherein, to retrieve media content based at least in part on the new FDT instance, the MBMS terminal is further configured to send a second GET request to obtain files of interest from the HTTP server, and wherein the HTTP server is further configured to, in response to the second GET request, send the files of interest to the MBMS terminal.

28. The system of claim 25, wherein the chunk of data is part of a multipurpose internet mail extensions (MIME) message.

29. The system of claim 25, wherein the persistent TCP connection is established using a unicast access universal resource identifier (URI) from received from a prior service announcement.

* * * * *